United States Patent [19]
Hoyt et al.

[11] Patent Number: 5,786,997
[45] Date of Patent: Jul. 28, 1998

[54] CAPACITIVELY COUPLED MULTIPLE AXIS DATA INPUT APPARATUS AND METHOD

[75] Inventors: Joshua K. Hoyt, Portland, Oreg.; Neil L. Brown, Falmouth, Mass.; William D. Leppo, Hillsboro, Oreg.

[73] Assignee: Ziba Design, Inc., Portland, Oreg.

[21] Appl. No.: 666,619

[22] Filed: Jun. 18, 1996

Related U.S. Application Data

[63] Continuation-in-part of Ser. No. 492,655, Jun. 20, 1995, Pat. No. 5,687,080.

[51] Int. Cl.$^6$ .................................................. G05B 9/02
[52] U.S. Cl. ........................ 364/190; 73/862.043; 361/290
[58] Field of Search ................... 364/190, 709.11; 73/862.68, 862.043, 724; 463/38; 200/6 A; 341/20, 33; 361/283.2, 300, 290; 74/471 XY; 345/156–158, 161

[56] References Cited

U.S. PATENT DOCUMENTS

| | | | |
|---|---|---|---|
| 3,270,260 | 8/1966 | Mehr | 317/255 |
| 3,886,361 | 5/1975 | Wester | 250/338 |
| 4,320,392 | 3/1982 | Giovinazzo et al. | 73/862.68 |
| 4,369,663 | 1/1983 | Venturello et al. | 73/862.043 |
| 4,459,578 | 7/1984 | Sava et al. | 338/128 |
| 4,462,015 | 7/1984 | Netzer | 336/135 |
| 4,825,157 | 4/1989 | Mikan | 324/208 |
| 4,876,524 | 10/1989 | Jenkins | 338/2 |
| 4,879,556 | 11/1989 | Duimel | 341/20 |
| 4,952,919 | 8/1990 | Nippoldt | 340/710 |
| 5,128,671 | 7/1992 | Thomas, Jr. | 341/20 |

FOREIGN PATENT DOCUMENTS

| | | | |
|---|---|---|---|
| 2516296 | 5/1983 | France | H01H 25/00 |
| 9208208 | 5/1992 | WIPO | G06K 11/18 |

OTHER PUBLICATIONS

"Keyboard Scanned Capacitive Joy Stick Cursor Control," IBM TECHNICAL DISCLOSURE BULLETIN, Vol. 23, No. 8, Jan. 1981, pp. 3831–3834.

"The Design of Synactic Foam Pressure Housings for Expendable Acoustic Beacons, One Facet of a Prototype Oceanographic Current Profiling Inst.", Master's thesis of Joshua K. Hoyt, Massachusetts Institute of Technology, Cambridge, MA, Jun. 1982, pp. cover, 2, and 62–65.

"Positioning and Tracking Controls for the Human Operator," Catalog C5 85, Measurement Systems, Inc., Norwalk, CT, pp. cover and 15.

Primary Examiner—Paul P. Gordon
Assistant Examiner—Steven R. Garland
Attorney, Agent, or Firm—Stoel Rives LLP

[57] ABSTRACT

A capacitively coupled, six axis joystick (320) employs a sensor electrode (310) having a perpendicular pair of slots (312, 314) and a fixed electrode assembly (300) having capacitor electrodes ($C_S$) formed on three mutually orthogonal surfaces of planar circuit boards (302, 304, 306) that are complementarily nested within the slots of the sensor electrode. When nested together, the capacitor electrodes are separated from faces of the sensor electrode by spacings that depend on the rotational and translational movements of the sensor electrode relative to the electrode assembly. A signal generator (352) and address decoder (354) sequentially apply an alternating signal to the capacitor electrodes. The alternating signal is coupled to the closest associated faces of the sensor electrode to a degree dependent on the rotation- and translation-induced spacings. A controller (350) detects and processes each coupled signal voltage to determine a degree of deflection of the sensor electrode in the X-, Y-, Z-, roll-, pitch-, and yaw-axis directions.

61 Claims, 12 Drawing Sheets

CAPACITIVELY COUPLED MULTIPLE AXIS DATA INPUT APPARATUS AND METHOD

RELATED APPLICATION

This application is a continuation-in-part of U.S. patent application Ser. No. 08/492,655, now U.S. Pat. No. 5,687, 080, filed Jun. 20, 1995.

TECHNICAL FIELD

This invention relates to computer data input devices and more particularly to an apparatus and a method in which joystick motion is sensed for up to six degrees of freedom.

BACKGROUND OF THE INVENTION

The ever-improving performance of computers and computer programs has spawned a corresponding need for higher capability user input devices. Emerging computer application programs for word processing, data entry, three-dimensional mechanical design, flight simulation, and consumer-oriented games all demand multiple degree-of-freedom (hereafter "axis") data input. However, prior computer input devices, such as joysticks, trackballs, graphic tablets, and mice are limited by their construction to two or three axis operation, whereas up to six axis operation is desirable in many applications.

FIG. 1 shows the six axes as three mutually perpendicular translational motion axes (hereafter referred to as an X-axis, a Y-axis, and a Z-axis) and three mutually perpendicular rotational motion axes (hereafter referred to as a roll axis, a pitch axis, and a yaw axis). Skilled workers typically refer to roll as an angular rotation about the X-axis, pitch as an angular rotation about the Y-axis, and yaw as an angular rotation about the Z-axis.

A joystick typically employs a user-positioned actuator handle pivoted about a fixed point to actuate two mutually perpendicular potentiometers that generate respective X- and Y-axis data. In some joysticks, springs are employed to return the actuator handle to a centered position. However, potentiometers have friction that leads to unrepeatable data generation and difficulty in "zeroing" the joystick.

As a result, other workers have employed optical encoders, switch arrays, piezo-electric transducers, strain-gauges, capacitive coupling devices, inductive coupling devices, and magnetic devices to circumvent the electromechanical problems inherent in potentiometers. Unfortunately, as they were configured, none of the prior devices provided any additional axes of operation, some were too costly for consumer-oriented data input applications, and others unduly restricted actuator motion, which degrades user "feel."

For example, a mouse typically employs a user-positioned ball that rolls in constraining bearings to frictionally rotate two mutually perpendicular devices, such as optical encoders that generate respective X- and Y-axis data. Because the mouse moves on a flat surface, only two axes of data are generated. However, a mouse typically incorporates at least one additional user-actuated button that may be used to change the operating mode of the mouse. For example, the X- and Y-axis translation data may be converted to roll and pitch data when the button is depressed. Of course, the addition of buttons does not change the fact that the mouse is limited to operating in only two axes at a time. Moreover, the bearings and frictional couplings are prone to irregular rotation caused by accumulated contaminates that are picked from the flat surface by the ball.

An exemplary three axis input device is described in U.S. Pat. No. 4,952,919 for TRACKBALL MECHANISM. A trackball can be thought of as an inverted mouse in which the ball is directly accessible to user manipulation. In this particular trackball, the ball rolls in constraining bearings that are positioned to expose to user manipulation a majority of the ball surface area. Moreover, the ball frictionally rotates three mutually perpendicular optical encoders that generate respective X-, Y-, and Z-axis (or alternatively roll-, pitch-, and yaw-axis) data.

An exemplary four axis input device is the model 426-G811 Four Axis Control manufactured by Measurement Systems, Inc., of Norwalk, Conn. The Four Axis Control is a potentiometer-based joystick in which the actuator handle is movable in the X-, Y-, and Z-axis directions and is rotatable about the Z-axis. The four axes of motion are each coupled to potentiometers that produce X-, Y-, and Z-axis translational data and yaw-axis rotational data. Of course, the Four Axis Control is costly and has the typical disadvantages associated with potentiometers and their associated coupling mechanisms.

What is needed, therefore, is an inexpensive user input device that has good user feel, senses more than four axes of motion applied to a single actuator handle, and responds by generating accurate and repeatable input data.

SUMMARY OF THE INVENTION

An object of this invention is, therefore, to provide a multiple axis, single actuator data input apparatus and method.

Another object of this invention is to provide a multiple axis data input apparatus and method that generates accurate and repeatable input data.

A further object of this invention is to provide a multiple axis data input apparatus having low friction and good user feel.

Still another object of this invention is to provide an inexpensive, multiple axis data input apparatus and method.

An inductively coupled embodiment of a six axis joystick employs a 13 pole E-core that includes a center pole and four triads of outer poles that protrude from four orthogonally separated arms of the E-core. A drive winding is wound around the center pole of the E-core, and sense windings are wound around each of the outer poles. A compression spring suspends a ferromagnetic swash plate at substantially equal distances from the center pole and each of the outer poles. A user employs an actuator handle to axially and rotationally deflect the swash plate to assume varying distances from the center pole and each of the outer poles. A varying magnetic flux induced by the center pole is conducted through the swash plate to each of the outer poles to a degree dependent on the spacing between each outer pole from a bottom surface or a periphery of the swash plate. Corresponding signal currents are induced in the sense windings. Each of the signal currents is proportional to the degree of magnetic flux flowing in its associated outer pole. A peak amplitude is detected for each signal current, and the differences among the peak amplitudes are used to determine a degree of deflection of the swash plate in each of the X-, Y-, Z-, roll-, pitch-, and yaw-axis directions.

In another embodiment, the E-core is replaced by discrete inductors mounted to a circuit board or, in an alternative embodiment, by Hall-effect devices that sense permanent magnets that are attached to a nonferromagnetic swash plate.

Also, user feel may be improved by replacing the compression spring with a flexible diaphragm, a rubber bladder or, preferably, a suspension cage.

A preferred capacitively coupled embodiment of a six axis joystick employs a sensor electrode having a perpendicular pair of slots and a fixed electrode assembly having capacitor electrodes formed on three mutually orthogonal surfaces of planar circuit boards that are sized and positioned such that they complementarily nest within the slots of the sensor electrode. When nested together, the capacitor electrodes are spaced apart from faces of the sensor electrode by distances that depend on the rotational and translational movements of the sensor electrode relative to the electrode assembly. An alternating voltage is selectively applied to the capacitor electrodes and is, thereby, coupled to the closest associated faces of the sensor electrode to a degree dependent on the rotation- and translation-induced spacings. An amplitude is detected and processed for each coupled signal voltage to determine a degree of deflection of the sensor electrode in the X-, Y-, Z-, roll-, pitch-, and yaw-axis directions. As with the inductively coupled embodiments, user feel may be tailored to particular applications by suspending the sensor electrode by a flexible diaphragm, rubber bladder, network of springs or, preferably, by an elastomeric ring.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 1:
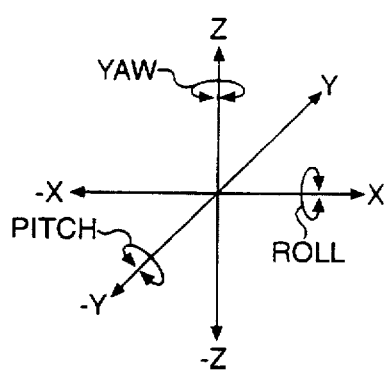
FIG. 1 is a diagram showing three mutually perpendicular translational motion axes and three mutually perpendicular rotational motion axes.
Figure 2A:
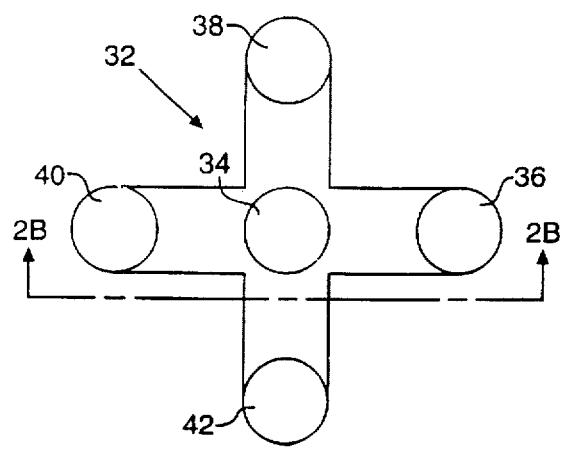
FIG. 2A is a top plan view of an E-core employed in a two axis inductively coupled joystick of this invention.
Figure 2C:
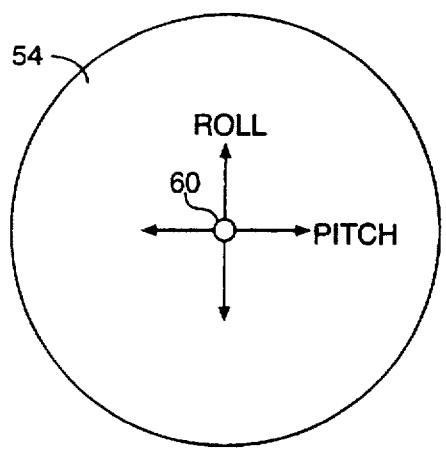
FIG. 2C is a top plan view showing a generally circular shape of the swash plate of FIG. 2B.
Figure 2B:
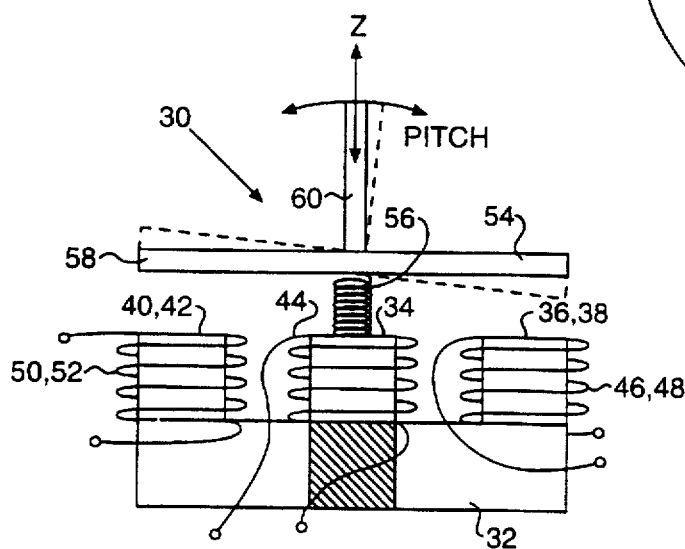
FIG. 2B is a sectional view of the E-core taken along lines 2B—2B of FIG. 2A, further showing a swash plate, a spring, and coupling coils of the two axis inductively coupled joystick of this invention.

FIGS. 2A–2C show a two axis joystick 30 in which a five pole E-core 32 includes a center pole 34 and four outer poles 36, 38, 40, and 42 that are arranged around center pole 34 as orthogonally separated pairs of outer poles. A drive winding 44 is wound around center pole 34 of five pole E-core 32, and sense windings 46, 48, 50, and 52 are wound around respective outer poles 36, 38, 40, and 42.

A swash plate 54 (FIG. 2C) is a substantially circular plate of ferromagnetic material suspended by a compression spring 56 such that, at an equilibrium position (shown in solid lines in FIG. 2B), a bottom surface 58 of swash plate 54 is substantially equidistant from center pole 34 and each of outer poles 36, 38, 40, and 42. An actuator handle 60 is attached to swash plate 54 by which a user deflects swash plate 54 (as shown, for example, in a pitch-axis direction in dashed lines in FIG. 2B), thereby causing bottom surface 58 to assume varying distances from center pole 34 and each of outer poles 36, 38, 40, and 42.

A driver (not shown) causes an alternating current to flow in drive winding 44, thereby inducing a corresponding magnetic flux in center pole 34 and swash plate 54. The magnetic flux induced in swash plate 54 is conducted through each of outer poles 36, 38, 40, and 42 to a degree dependent on the spacing of each pole from bottom surface 58 of swash plate 54. Corresponding signal currents are induced in sense windings 46, 48, 50, and 52. Each of the signal currents is proportional to the degree of magnetic flux flowing in its associated pole. A peak amplitude is detected for each signal current, and the differences among the peak amplitudes are used to determine a degree of deflection of swash plate 54 in, for example, the roll- and pitch-axis directions.

Because swash plate 54 is suspended by compression spring 56, a significant amount of the deflection of swash plate 54 may also be in the X- and Y-axis directions. However, the geometric configuration of two axis joystick 30 prevents effective detection of such deflections. Nevertheless, deflection of swash plate 54 in the Z-axis direction is readily determined from "common-mode" signal components generated by opposed pairs of the sense windings, such as, for example, sense windings 46 and 50. Therefore, two axis joystick 30 may be considered to be a three axis joystick, and, of course, the roll- and pitch-axis related signals may be readily converted to represent X-and Y-axis translations of actuator handle 60.

Figure 3A:
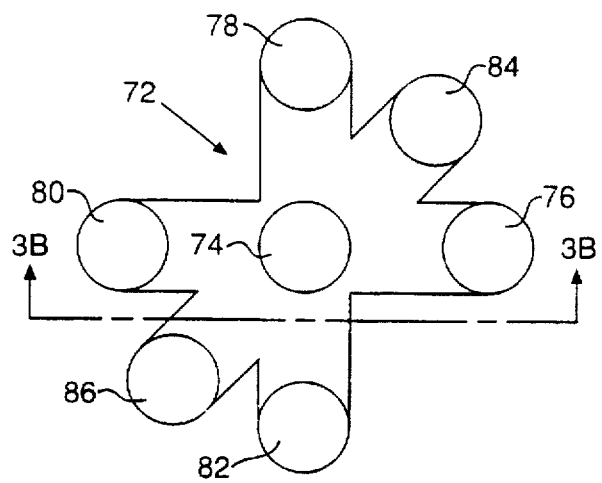
FIG. 3A is a top plan view of an E-core employed in a three axis inductively coupled joystick of this invention.
Figure 3C:
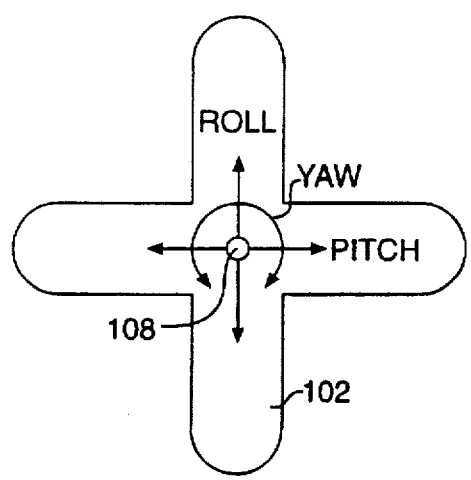
FIG. 3C is a top plan view showing a generally "crossed" shape of the swash plate of FIG. 3B.
Figure 3B:
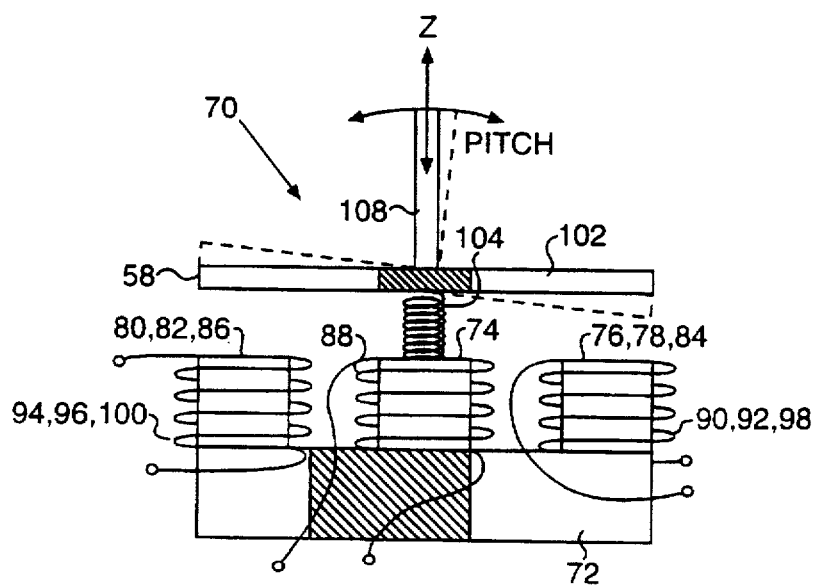
FIG. 3B is a sectional view of the E-core taken along lines 3B—3B of FIG. 3A, further showing a swash plate, spring, and coupling coils of the three axis inductively coupled joystick of this invention.

FIGS. 3A–3C show a three axis joystick 70 in which a seven pole E-core 72 includes a center pole 74, four outer poles 76, 78, 80, and 82 that are arranged around center pole 74 as orthogonally separated pairs of poles, an offset outer pole 84 that is positioned between outer poles 76 and 78, and an offset outer pole 86 that is positioned between outer poles 80 and 82. A drive winding 88 is wound around center pole 74 of seven pole E-core 72, and sense windings 90, 92, 94, 96, 98, and 100 are wound around respective outer poles 76, 78, 80, 82, 84, and 86.

A swash plate 102 (FIG. 3C) is a substantially "cross-shaped" plate of ferromagnetic material suspended by a compression spring 104 such that, at an equilibrium position (shown in solid lines in FIG. 3B), a bottom surface 106 of swash plate 102 is substantially equidistant from center pole 74 and each of outer poles 76, 78, 80, 82, 84, and 86. An actuator handle 108 is attached to swash plate 102 by which a user axially and rotationally deflects swash plate 102 (as shown, for example in a pitch-axis direction in dashed lines in FIG. 3B), thereby causing bottom surface 106 to assume varying distances from center pole 74 and each of the outer poles.

As described with reference to two axis joystick 30, a driver (not shown) causes an alternating current to flow in drive winding 88, thereby inducing a corresponding magnetic flux in center pole 74 and swash plate 102. The magnetic flux induced in swash plate 102 is conducted through each of outer poles 76, 78, 80, and 82 to a degree dependent on the pitch- and roll-axis-induced spacing of each respective pole from bottom surface 106 of swash plate 102 and through each of offset outer poles 84 and 86 to a degree dependent on the yaw-axis-induced spacing of each respective pole from bottom surface 106 of swash plate 102. Corresponding signal currents are induced in sense windings 90, 92, 94, 96, 98, and 100. Each of the signal currents is proportional to the degree of magnetic flux flowing in its associated outer pole. A peak amplitude is detected for each signal current, and the differences among the peak amplitudes are used to determine a degree of deflection of swash plate 102 in, for example, the roll-, pitch-, and yaw-axis directions.

Because swash plate 102 is suspended by compression spring 104, a significant amount of deflection of swash plate 102 may also be in the X- and Y-axis directions. However, the geometric configuration of three axis joystick 70 is more conducive to detecting rotational axis deflections. Nevertheless, as for two axis joystick 30 (FIG. 2B), deflection of swash plate 102 in the Z-axis direction is readily determined from "common-mode" signal components generated by opposed pairs of the sense windings, such as, for example, sense windings 90 and 94. Therefore, three axis joystick 70 may be considered to be a four axis joystick, and, of course, the roll- and pitch-axis related signals are easily converted to represent X- and Y-axis translation of actuator handle 60.

Figure 4A:
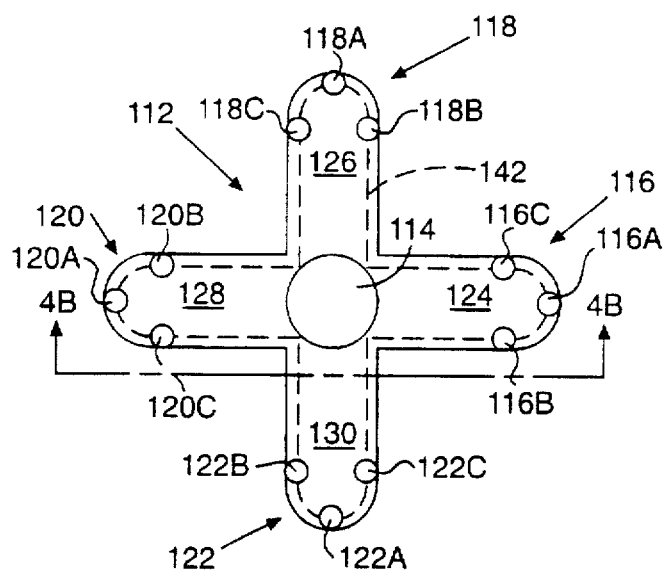
FIG. 4A is a top plan view of an E-core employed in a first embodiment of a six axis inductively coupled joystick of this invention.
Figure 4C:
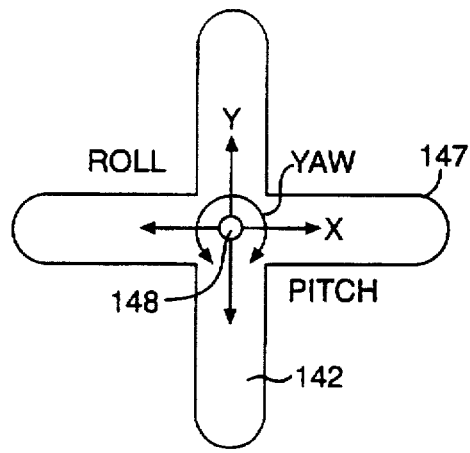
FIG. 4C is a top plan view showing the generally "crossed" shape of the swash plate of FIG. 4B.
Figure 4B:
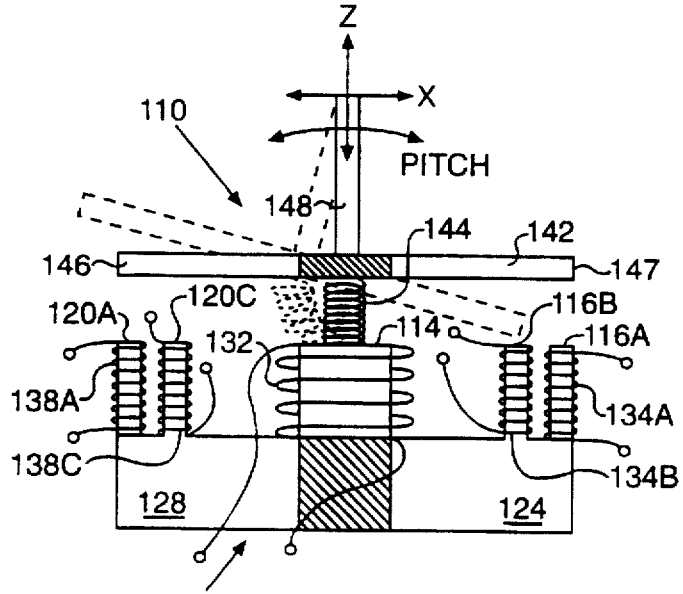
FIG. 4B is a sectional view of the E-core taken along lines 4B—4B of FIG. 4A, further showing a swash plate, a spring, and coupling coils of the first embodiment of the six axis inductively coupled joystick of this invention.

FIGS. 4A–4C show a six axis joystick 110 in which a 13 pole E-core 112 includes a center pole 114 and four triads of outer poles 116, 118, 120, and 122 that are arranged such that each triad of poles protrudes from an associated end of four orthogonally separated arms 124, 126, 128, and 130 of 13 pole E-core 112. (Each corresponding pole in the four triads of poles 116, 118, 120, and 122 is identified by a letter suffix A, B, or C.) A drive winding 132 is wound around center pole 114 of 13 pole E-core 112, and 12 sense windings 134A–134C, 136A–134C, 138A–134C, and 140A–134C (only 134A, 134B, 138A, and 138C are shown) are wound around respective poles in the four triads of outer poles 116, 118, 120, and 122. (Each sense winding is identified by the letter suffix of its associated pole.)

A swash plate 142 (FIG. 4C) is a substantially "cross-shaped" plate of ferromagnetic material suspended by a compression spring 144 such that, at an equilibrium position (shown in solid lines in FIG. 4B), a bottom surface 146 of swash plate 142 is substantially equidistant from center pole 114 and each of the outer poles. The major dimensions of swash plate 142 are sized (as shown in dashed lines in FIG. 4A) to be slightly smaller than the corresponding dimensions of 13 pole E-core 112 such that, at the equilibrium position, a periphery 147 is substantially aligned with the axial centers of each of the outer poles. An actuator handle 148 is attached to swash plate 142 by which a user axially and rotationally deflects swash plate 142 (as shown in dashed lines, for example, in X-, Z-, and pitch-axis directions in FIG. 4B), thereby causing bottom surface 146 to assume various distances from center pole 114 and each of the outer poles.

As described with reference to joysticks 30 and 70, a driver (not shown) causes an alternating current to flow in drive winding 132, thereby inducing a corresponding magnetic flux in center pole 114 and swash plate 142. The magnetic flux induced in swash plate 142 is conducted through each of the 12 outer poles to a degree dependent on the rotational and translational-axis-induced spacing of each respective pole from bottom surface 146 and periphery 147 of swash plate 142. Corresponding signal currents are induced in sense windings 134A-134C, 136A-136C, 138A-138C, and 140A-140C. Each of the signal currents is proportional to the degree of magnetic flux flowing in its associated outer pole. A peak amplitude is detected for each signal current, and the differences among the peak amplitudes are used to determine a degree of deflection of swash plate 142 in X-, Y-, Z-, roll-, pitch-, and yaw-axis directions.

Six axis data generation is possible because the configuration of triads of outer poles 116, 118, 120, and 122 causes relatively large spacing differences to occur between combinations of bottom surface 146, periphery 147, and the outer is poles in response to translational and rotational deflections of swash plate 142.

Compression spring 144 allows swash plate 142 to move freely through a large displacement range, provides deflection resistance that is proportional to the displacement, provides spring return to the equilibrium position, and enables building six axis joystick 110 with few moving parts.

Figure 5A:
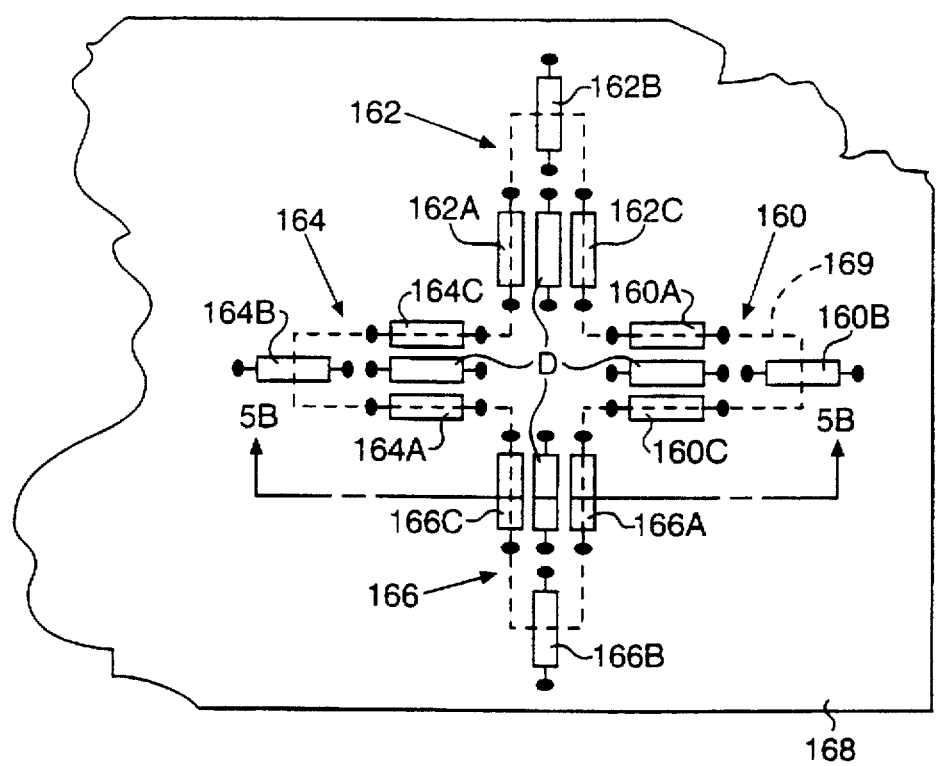
FIG. 5A is a top plan view showing a second embodiment of the six axis inductively coupled joystick of FIG. 4 in which the E-core is replaced by discrete inductors mounted to a circuit board.
Figure 5B:
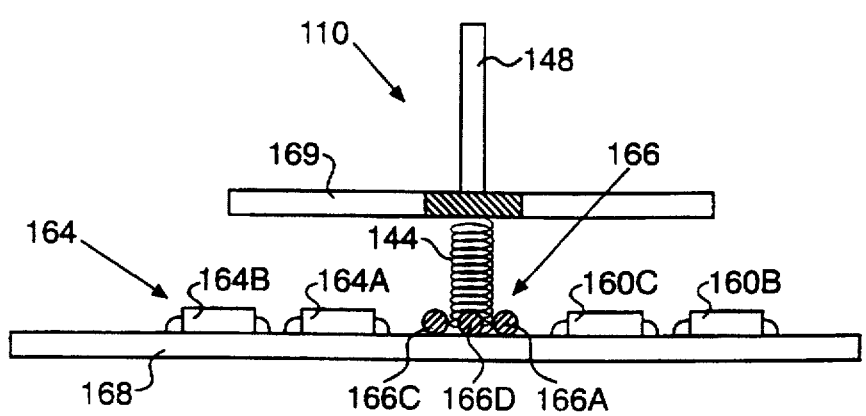
FIG. 5B is a sectional view of the discrete inductors and circuit board taken along lines 5B—5B of FIG. 5A, further showing a swash plate and spring of the second embodiment of the six axis inductively coupled joystick of this invention.

FIGS. 5A and 5B show an alternative embodiment of six axis joystick 110 in which 13 pole E-core 112 is replaced by discrete inductor arrays 160, 162, 164, and 166 that are mounted to a circuit board 168. Each inductor array includes a driver inductor D surrounded by sense inductors A, B, and C that are arranged in positions functionally corresponding to the positions of the outer poles of 13 pole E-core 112. Driver inductors D functionally replace drive winding 132. Each inductor is a commercially available 220 microhenry, axial leaded component.

FIG. 5A shows (in dashed lines) a cross-shaped swash plate 169 formed from a ferromagnetic material, preferably steel. Swash plate 169 is sized to overlay the approximate centers of sense inductors 160A–160C, 162A–162C, 164A–164C, and 166A–166C. In the FIG. 5 embodiment, each cross arm of swash plate 169 has a tip-to-tip length of about 3.75 centimeters, a width of about 0.5 centimeter, and a thickness of about 1.6 millimeters. In the equilibrium position shown in FIG. 5B, swash plate 169 is suspended above discrete inductor arrays 160, 162, 164, and 166 by a distance of about 0.5 centimeter to about 2.0 centimeters.

A driver, such as one described below with reference to FIG. 10, sequentially causes an alternating current to flow in driver inductors 160D, 162D, 164D, and 166D, thereby inducing a corresponding magnetic flux in each arm of swash plate 169. The magnetic flux induced in swash plate 142 is conducted through and induces signal currents in each of the 12 sense inductors 160A–160C, 162A–162C, 164A–164C, and 166A–166C to a degree dependent on the rotational and translational-axis-induced spacing of each respective discrete inductor from swash plate 169. A peak amplitude is detected for each signal current, and the differences among the peak amplitudes are used to determine a degree of deflection of swash plate 142 in X-, Y-, Z-, roll-, pitch-, and yaw-axis directions.

Figure 6A:
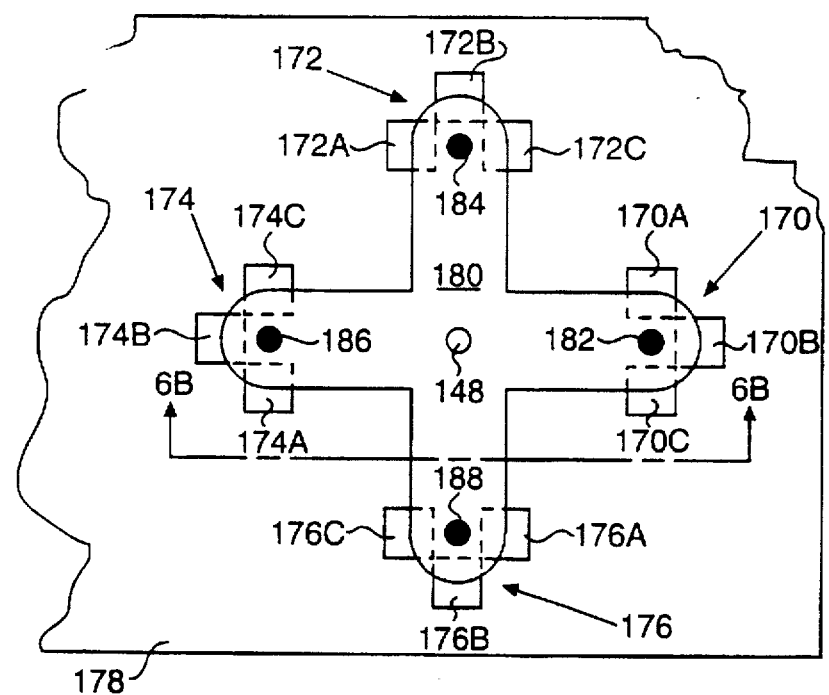
FIG. 6A is a top plan view showing an alternative embodiment of the six axis joystick of FIG. 5 in which the discrete inductors are replaced by Hall-effect devices, and in which permanent magnets are mounted in a non-ferromagnetic swash plate.
Figure 6B:
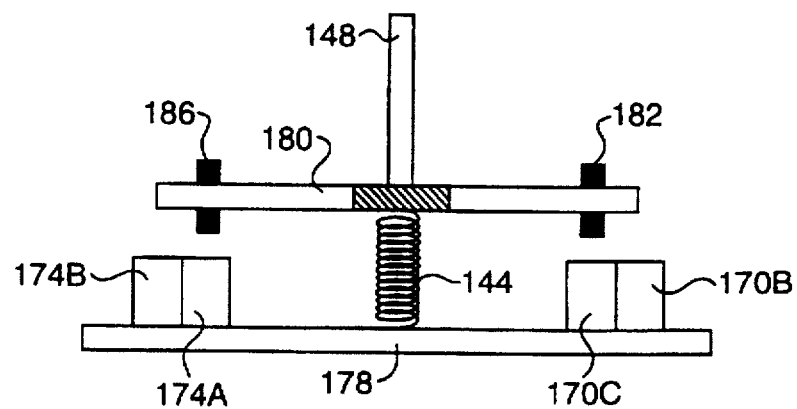
FIG. 6B is a sectional view taken along lines 6B—6B of FIG. 6A, showing the Hall-effect devices, permanent magnets, swash plate, and circuit board, and further showing the spring of the alternative embodiment of the six axis joystick of FIG. 5.

FIGS. 6A and 6B show a second alternative embodiment of six axis joystick 110 in which 13 pole E-core 112 is replaced by Hall-effect sensor arrays 170, 172, 174, and 176 that are mounted to a circuit board 178. Each Hall-effect sensor array includes individual Hall-effect sensors A, B, and C that are arranged in positions functionally corresponding to the positions of the outer poles of 13 pole E-core 112. An arbitrarily shaped swash plate 180 (an exemplary crossed shape is shown in FIG. 6A) is a plate of nonferromagnetic material in which permanent magnets 182, 184, 186, and 188 are embedded such that, at an equilibrium position (shown in FIG. 6B), permanent magnets 182, 184, 186, and 188 are substantially equidistant from their associated Hall-effect sensors A, B, and C in Hall-effect sensor arrays 170, 172, 174, and 176. Operationally, permanent magnets 182, 184, 186, and 188 functionally replace drive winding 132, and Hall-effect sensor arrays 170, 172, 174, and 176 functionally replace triads of outer poles 116, 118, 120, and 122.

The Hall-effect sensed embodiment is less sensitive than the inductively sensed embodiment to displacements of actuator handle 148, but may be more suitable for use in certain applications.

Figure 7:
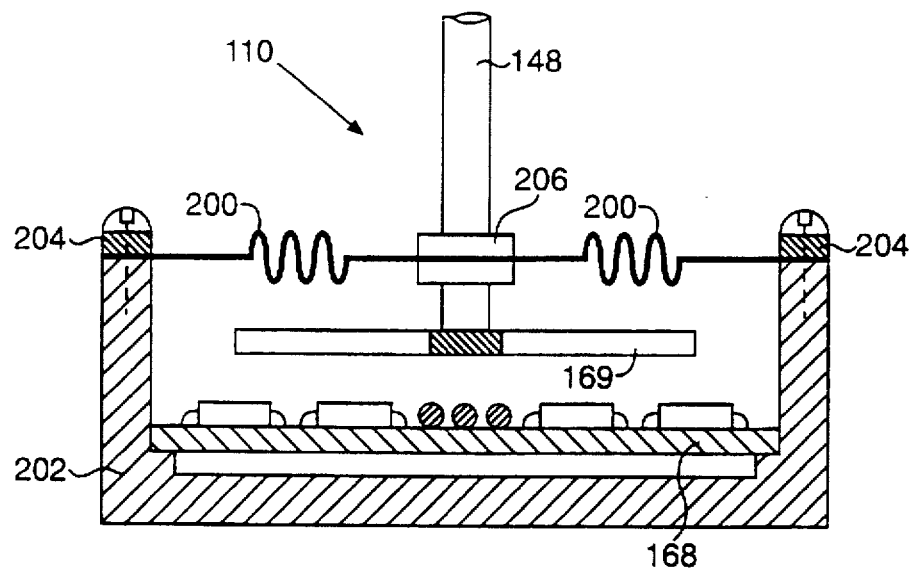
FIG. 7 is a cross-sectional side view of the discrete inductor embodiment of the six axis joystick of FIG. 5, in which the spring is replaced by a flexible diaphragm.
Figure 8:
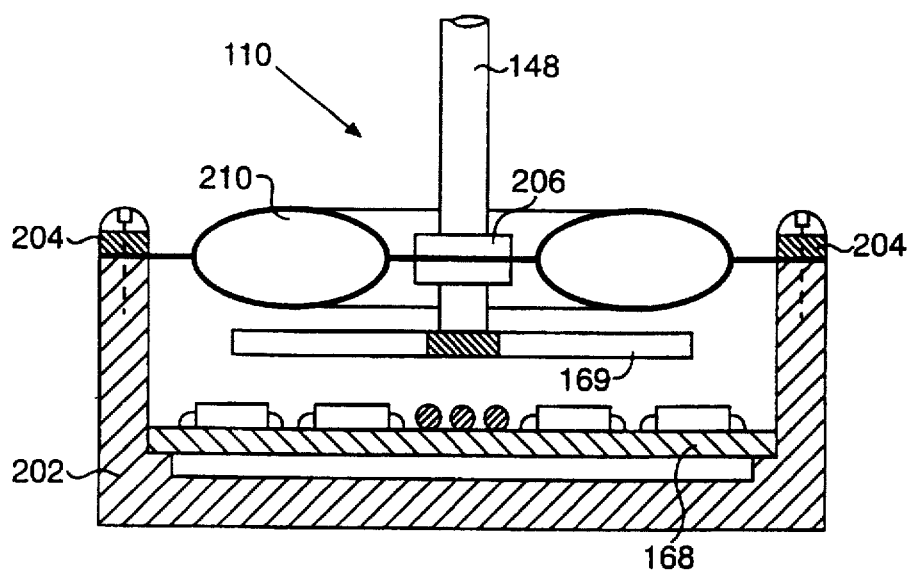
FIG. 8 is a cross-sectional side view of the discrete inductor embodiment of the six axis joystick of FIG. 5, in which the spring is replaced by a rubber bladder.

FIG. 8 shows a second alternative embodiment of six axis joystick 110 of FIG. 7 in which flexible diaphragm 200 is replaced by a rubber bladder 210. Further benefits of rubber bladder 210 include improved vertical stability that reduces "sagging" of swash plate 142 toward circuit board 168 and "tunable" user feel provided by varying an inflation pressure of rubber bladder 210.

Figure 9A:
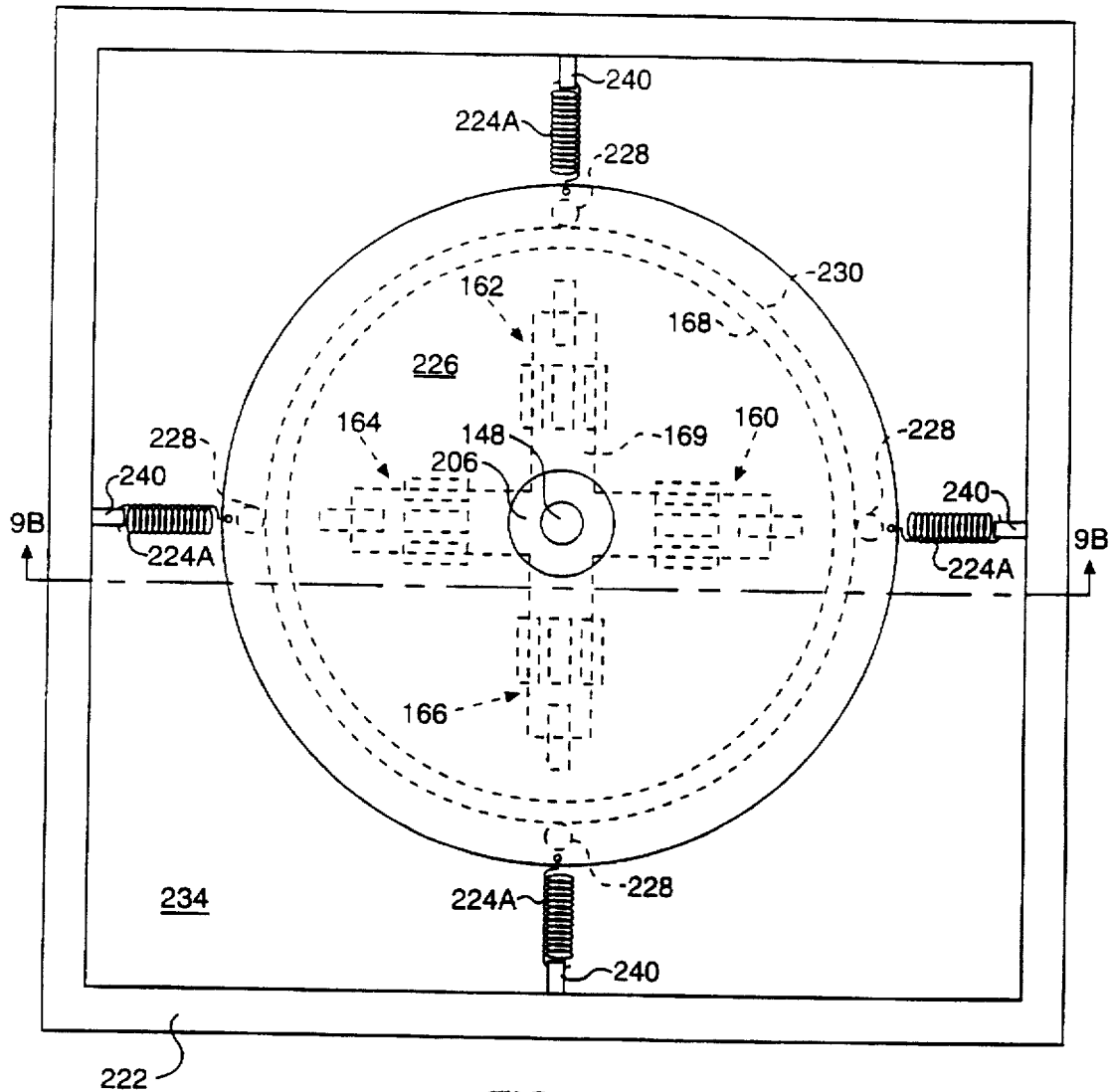
FIG. 9A is a top plan view of a discrete inductor embodiment of the six axis joystick of FIG. 5 showing the swash plate mounted in a suspension cage that is suspended in a housing by a network of springs.
Figure 9B:
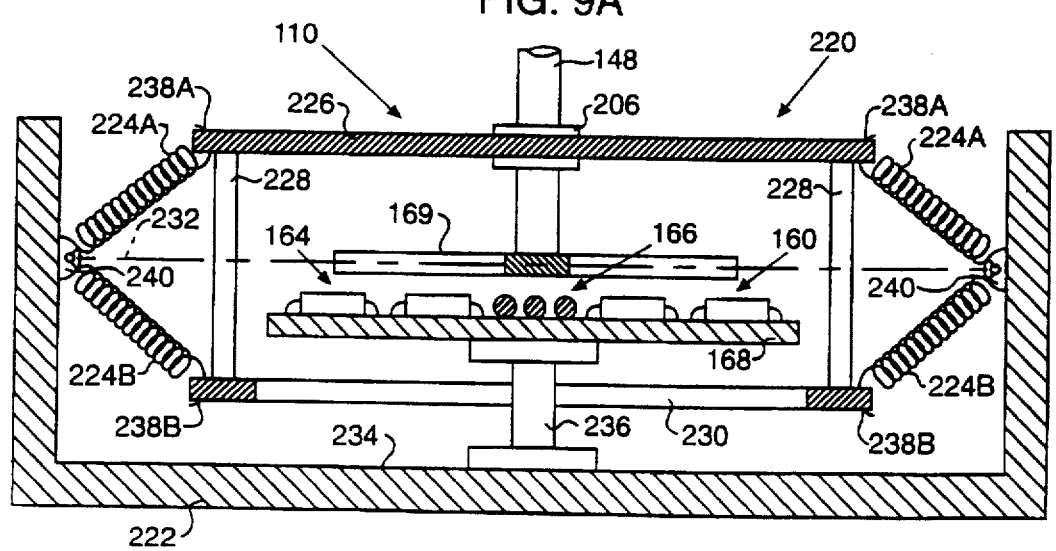
FIG. 9B is a sectional side view taken along lines 9B—9B of FIG. 9A showing the swash plate mounted in the suspension cage, the housing, the network of springs, and the discrete inductors mounted to a circuit board.

FIGS. 9A and 9B show another embodiment of six axis joystick 110 of FIG. 7 in which flexible diaphragm 200 is replaced by a suspension cage 220 that is suspended within a housing 222 by four sets of springs 224.

Suspension cage 220 includes a substantially circular top plate 226 that is rigidly spaced apart by four spacers 228 from a substantially circular open-bottom hoop 230. Collar 206 fastens actuator handle 148 to top plate 226 such that swash plate 169 is positioned substantially along a centerline 232 of suspension cage 220 (equidistant between top plate 226 and open-bottom hoop 230).

Circuit board 168 is rigidly suspended through open-bottom hoop 230 and above a floor 234 of housing 222 by a pedestal 236 that positions discrete inductor arrays 160, 162, 164, and 166 a suitable distance from swash plate 169.

Each set of springs 224 includes an upper spring 224A and a lower spring 224B. Each upper spring 224A is mechanically suspended between one of four mounting holes 238A in top plate 226 and an associated one of four mounting brackets 240 positioned along centerline 232 on housing 222. Likewise, each lower spring 224B is mechanically suspended between one of four mounting holes 238B in open-bottom hoop 230 and an associated one of the four mounting brackets 240. Mounting holes 238 are preferably positioned adjacent to spacers 228. The spacing between suspension cage 220 and housing 222 is such that each of upper springs 224A is preferably substantially orthogonal to its associated lower spring 224B. Moreover, each of the four sets of springs 224 is positioned about 90 degrees apart from one another around top plate 226, open-bottom hoop 230, and housing 222.

The benefits of suspension cage 220 include improved isolation of translational and rotational displacements, improved stability of and return to the equilibrium position, much improved user feel, and improved mechanical strength. It is envisioned that further improvements can be realized by replacing sets of springs 224 with flexible diaphragms or rubber bladders that extend laterally into retaining rings in housing 222.

Figure 10:
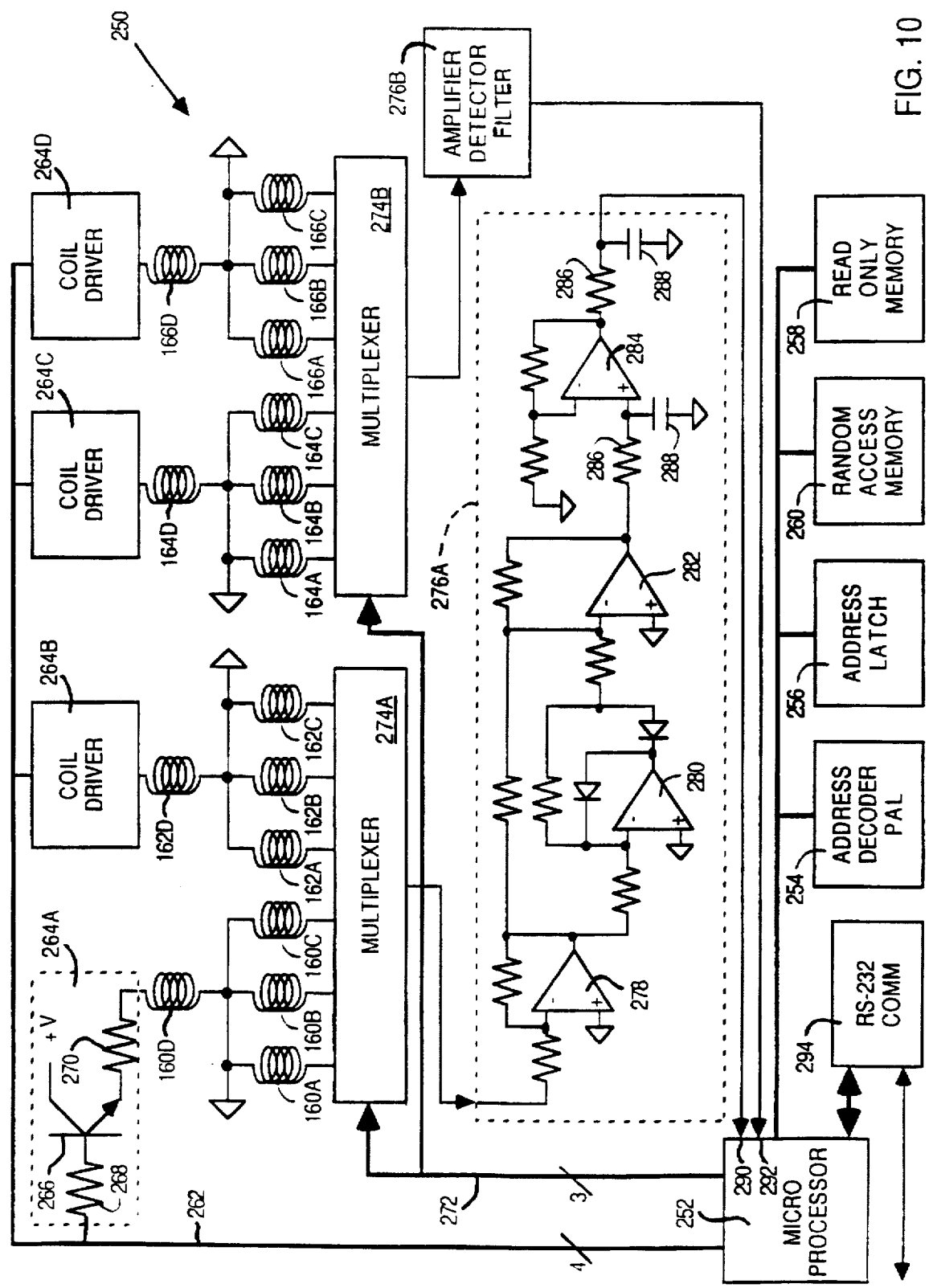
FIG. 10 is a simplified block and electrical circuit diagram showing an inductively coupled embodiment of an embedded joystick controller of this invention.

FIG. 10 shows an embedded joystick controller 250 suitable for use with inductively coupled six axis joystick 110 of FIGS. 5A and 5B. A Motorola type MC68HC11 microprocessor 252 is conventionally interconnected with a type 74HC138 address decoder PAL 254 and a type 74HC573 address latch 256 to access information stored in a type 27C256 read-only memory ("ROM") 258 and to store and access information in a type 62256 random-access memory ("RAM") 260.

A program stored in RAM 260 causes microprocessor 252 to sequentially provide 100 microsecond periods of 100 kilohertz energy on a driver bus 262 such that coil drivers 264A, 264B, 264C, and 264D (collectively "coil drivers 264") sequentially energize respective driver inductors 160D, 162D, 164D, and 166D, which each couple magnetic flux into an associated arm of swash plate 169. Each of coil drivers 264 includes a 2N3904 transistor 266, the base of which is driven by driver bus 262 through a 1,000 ohm resistor 268, and the emitter of which drives an associated one of driver inductors 160D, 162D, 164D, and 166D through a 100 ohm resistor 270.

Associated sets of sense inductors 160A–160C, 162A–162C, 164A–164C, and 166A–166C sequentially receive the 100 microsecond periods of magnetic flux by inductive coupling from swash plate 169. Of course, the degree of inductive coupling to each sense inductor, and the resulting signal current flowing in each sense inductor, depends on its distance from swash plate 169.

During each 100 microsecond period, microprocessor 252 also provides on a sampling bus 272 a three bit multiplexing address that causes a pair of LF13508 multiplexers 274A and 274B to sequentially sample the sense inductors for 15 microsecond periods. Multiplexer 274A samples sense inductors 160A–160C and 162A–162C, and multiplexer 274B simultaneously samples sense inductors 164A–164C and 166A–166C.

Multiplexers 274A and 274B provide their 15 microsecond signal current samples to substantially identical amplifier/detector/filter circuits 276A and 276B. (Because of the similarity of circuits 276A and 276B, FIG. 10 shows in detail the electrical components only of circuit 276A.) Each signal current sample is converted to a signal voltage by an operational amplifier 278 having a closed-loop gain of about 1,000. A peak detector 280 and an inverting amplifier 282 provide a peak voltage value for each sample, which is subsequently filtered by a two-pole active filter 284 that includes two RC filters consisting of 100 kiloohm resistors 286 in series with 0.1 microfarad capacitors 288. The resulting filtered peak signal voltages are connected to 8-bit analog-to-digital converter inputs 290 and 292 of microprocessor 252 for further processing.

The further processing entails employing the digitized peak voltage samples for each sense inductor as an address into a lookup table stored in ROM 258, which returns a value corresponding to the distance between swash plate 169 and the particular sense inductor being sampled. The returned values are collectively processed, either by an algorithm, or preferably, by a secondary lookup table, into spatial orientation data that represent the X-, Y-, Z-, roll-, pitch-, and yaw-axis orientations of swash plate 169.

The spatial orientation data are transmitted by a MAX232 RS-232 communications controller 294 to a user device such as a personal computer.

Figure 11:
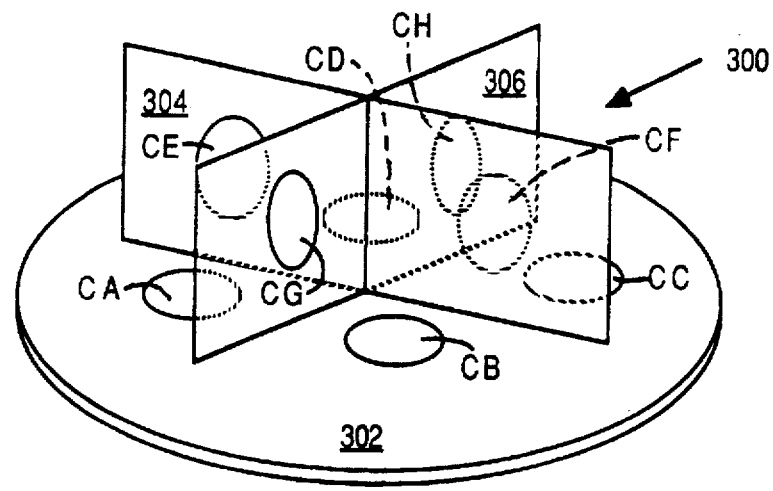
FIG. 11 is an isometric view of an electrode assembly employed in a capacitively coupled embodiment of a six axis joystick of this invention.

FIG. 11 shows an electrode assembly 300 for a six axis, capacitively coupled joystick embodiment in which four capacitor electrodes $C_A$, $C_B$, $C_C$, and $C_D$ are etched on a top surface of a circularly shaped, planar circuit board 302. Electrode assembly 300 further includes two capacitor electrodes $C_E$ and $C_F$ that are etched on opposite surfaces of a planar circuit board 304 that is mounted perpendicular to circuit board 302 and two capacitor electrodes $C_G$ and $C_H$ that are etched on opposite surfaces of a planar circuit board 306 that is mounted perpendicular to circuit boards 302 and 304 such that circuit boards 302, 304, and 306 are preferably mutually perpendicular to one another. Circuit boards 304 and 306 are preferably two-sided with a conductive ground plane positioned on the sides opposite capacitor electrodes $C_E$, $C_F$, $C_G$, and $C_H$.

Figure 12:
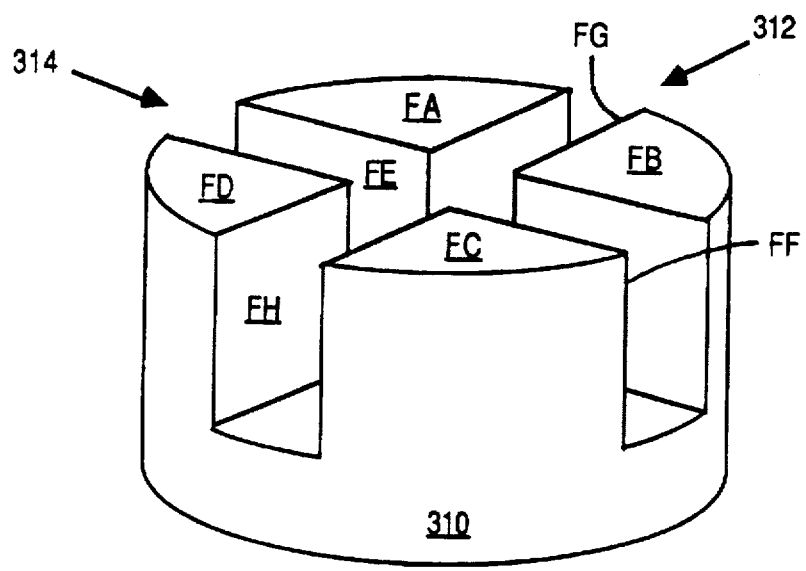
FIG. 12 is an isometric view of a sensor electrode employed in a capacitively coupled embodiment of a six axis joystick of this invention.

FIG. 12 shows a sensor electrode 310 that is formed from an electrically conductive, substantially cylindrical body having a diameter ranging from about 2.54 to about 5.0 centimeters (1.0 to 2.0 inches), preferably 3.8 centimeters (1.5 inch). Alternatively, sensor electrode may be formed from a nonconductive material having an electrically conductive coating. A pair of slots 312 and 314 are formed perpendicular to each other in one of the ends such that sensor electrode has end faces $F_A$, $F_B$, $F_C$, and $F_D$ and slot faces $F_E$, $F_F$, $F_G$, and $F_H$. Slots 312 and 314 range from about 0.64 to about 1.27 centimeters (0.25 to 0.5 inches) wide and from about 1.9 to about 3.2 centimeters (0.75 to 1.25 inches) deep, but are preferably 0.95 centimeters (0.375 inches) wide by 2.54 centimeters (1.0 inches) deep. FIG. 12 shows sensor electrode 310 inverted from its normal operating orientation.

Figure 13:
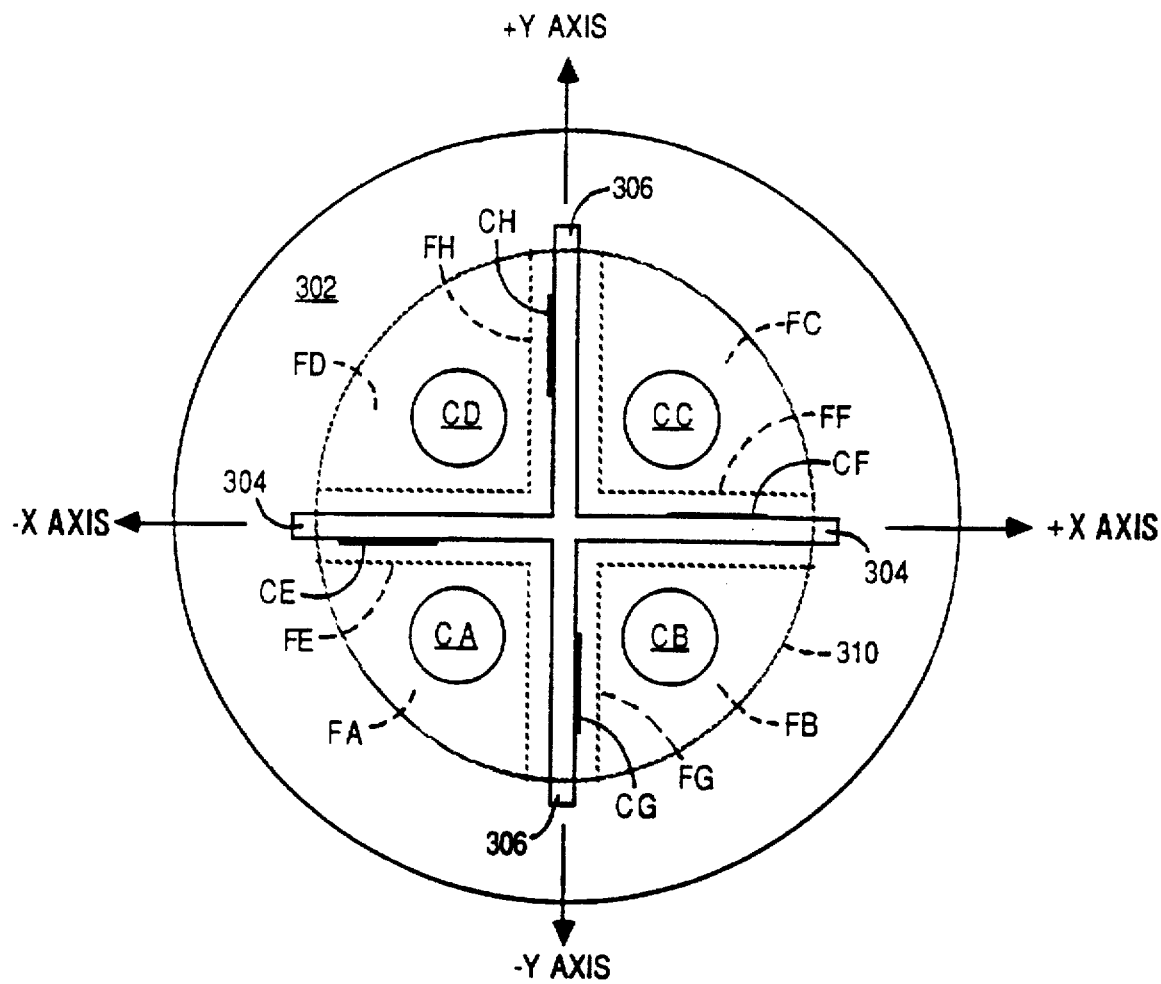
FIG. 13 is a top view of the electrode assembly of FIG. 11 mated in an operative configuration with the sensor electrode of FIG. 12.

As shown in FIGS. 13 (a top view) and 14 (a side view), slots 312 and 314 are sized and positioned such that circuit boards 304 and 306 of electrode assembly 300 complementarily nest within slots 312 and 314 of sensor electrode 310 (shown in dashed lines in FIG. 12). When nested together at the equilibrium position shown in FIGS. 13 and 14, capacitor electrodes $C_A$, $C_B$, $C_C$, $C_D$, $C_E$, $C_F$, $C_G$, and $C_H$ of electrode assembly 300 are about equally spaced apart from respective end faces $F_A$, $F_B$, $F_C$, and $F_D$ and slot faces $F_E$, $F_F$, $F_G$, and $F_H$. Of course, moving sensor electrode 310 relative to electrode assembly 300 causes detectable changes in the rotational and translational-axis-induced spacing between each capacitor electrode and a closest face on sensor electrode 310.

The capacitor electrodes are preferably disk-shaped and have small diameters compared to the dimensions of the faces on sensor electrode 310 such that there is minimal sensitivity to parallel motion between each capacitor electrode and its associated face. While the capacitor electrodes are preferably disk-shaped and have a 0.64 centimeter (0.25 inch) diameter, a wide range of other shapes and sizes are also operable. Electrode-to-sensor face spacing changes are detected and computed as described with reference to FIG. 16.

Figure 15:
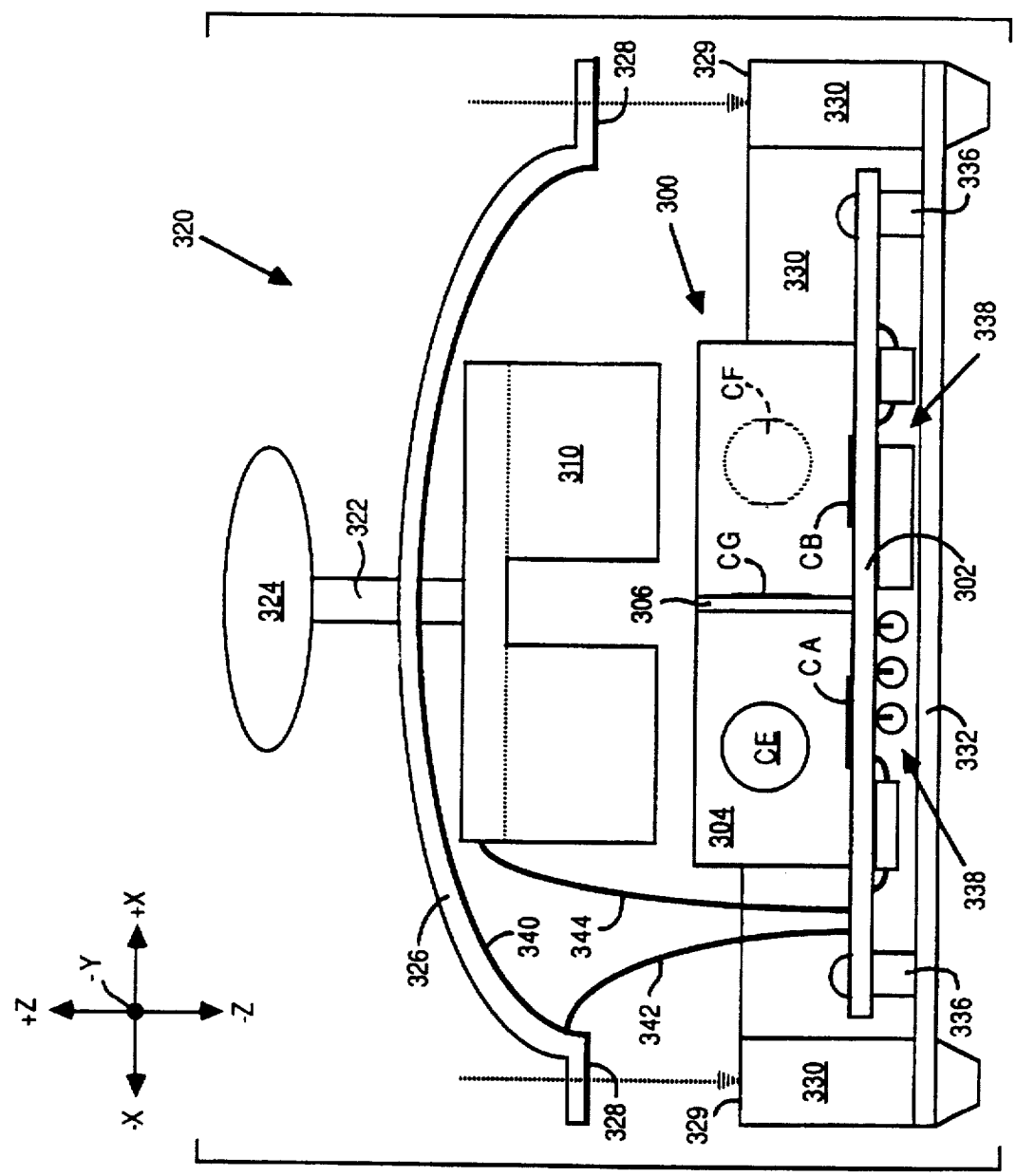
FIG. 15 is a side view of a capacitively coupled embodiment of a six axis joystick of this invention showing the sensor electrode of FIG. 12 mounted within a rigid dome and exploded apart from the electrode assembly of FIG. 11 and a deformable elastomeric ring to reveal the spatial configuration and straight-forward assembly of the joystick.

FIG. 15 shows a preferred embodiment of a capacitively coupled, six axis joystick 320 (hereafter "joystick 320") in which sensor electrode 310 is attached to one end of an actuator handle 322 having a hand grip 324 attached at the other end. Sensor electrode 310 may be suspended relative to electrode assembly 300 by any of the above-described springs, diaphragms, or bladders.

Preferably, however, actuator handle 322, and thereby sensor electrode 310, is attached within a rigid dome 326 having an integral peripheral mounting surface 328 that is bonded by a flexible glue to a mating surface 329 of an elastomeric ring 330. In like manner, elastomeric ring 330 is bonded to a rigid circular base plate 332. Elastomeric ring 330 not only provides a flexible suspension for sensor electrode 310, but also serves as a housing for electrode assembly 300.

Electrode assembly 300 is mounted slightly above base plate 332 by spacers 336. Electronic components 338 associated with an embedded controller (described with reference to FIG. 16) are mounted on the underside of circuit board 302 in the space between base plate 332 and circuit board 302.

Figure 14:
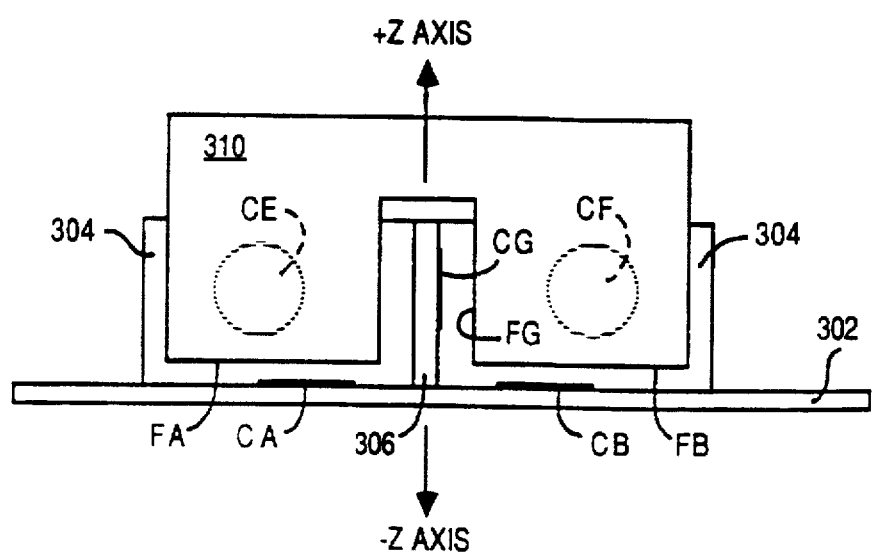
FIG. 14 is a side view of the electrode assembly of FIG. 11 mated in an operative configuration with the sensor electrode of FIG. 12.

Dome 326 and sensor electrode 310 are shown separated from electrode assembly 300 and elastomeric ring 330 for clarity and to emphasize the ease of assembly and electrical interconnection of the physically independent pieces. As described above, normally dome 326 is bonded at peripheral mounting surface 328 to mating surface 329 on elastomeric ring 330. When normally mated, dome 326 complementarily nests sensor electrode 310 within electrode assembly 300 in an equilibrium position as shown in FIGS. 13 and 14. Actuator handle 322 allows further positioning of sensor electrode 310 relative to electrode assembly 300.

Dome 326 further includes an electrically conductive inner surface 340 that is connected by a flexible wire 342 to a ground associated with electrode assembly 300 and base plate 332 to provide electrostatic shielding for joystick 320. A flexible wire 344 electrically connects sensor electrode 310 and the embedded controller to provide electrode-to-sensor spacing-related signals that are detected and computed as described with reference to FIG. 16.

Regarding user feel, the combination of dome 326 and elastomeric ring 330 provides actuator handle 322 with improved support in the +Z-axis direction for the mass of sensor electrode 310. Moreover, deflection of actuator handle 322 encounters resistance proportional to displacement. As deflecting forces are applied to hand grip 324, dome 326 transfers to elastomeric ring 330 a combination of compression, tension, and shear deformation stresses that provide a substantially frictionless, but damped return force to the equilibrium position. User feel is tunable to particular applications by selecting a suitable combination of elastomeric material, porosity, thickness, durometer, diameter, and height for elastomeric ring 330.

Other advantages of employing elastomeric ring 330 in joystick 320 include: manufacturability (easily die cut from a two-dimensional piece of material); improved reliability and reduced cost because of very few moving parts; simple joystick assembly; isolates (seals) internal components from the external dust, dirt, and contaminants; and allows sensing of relatively large displacements of sensor electrode 310 relative to electrode assembly 300.

Figure 16:
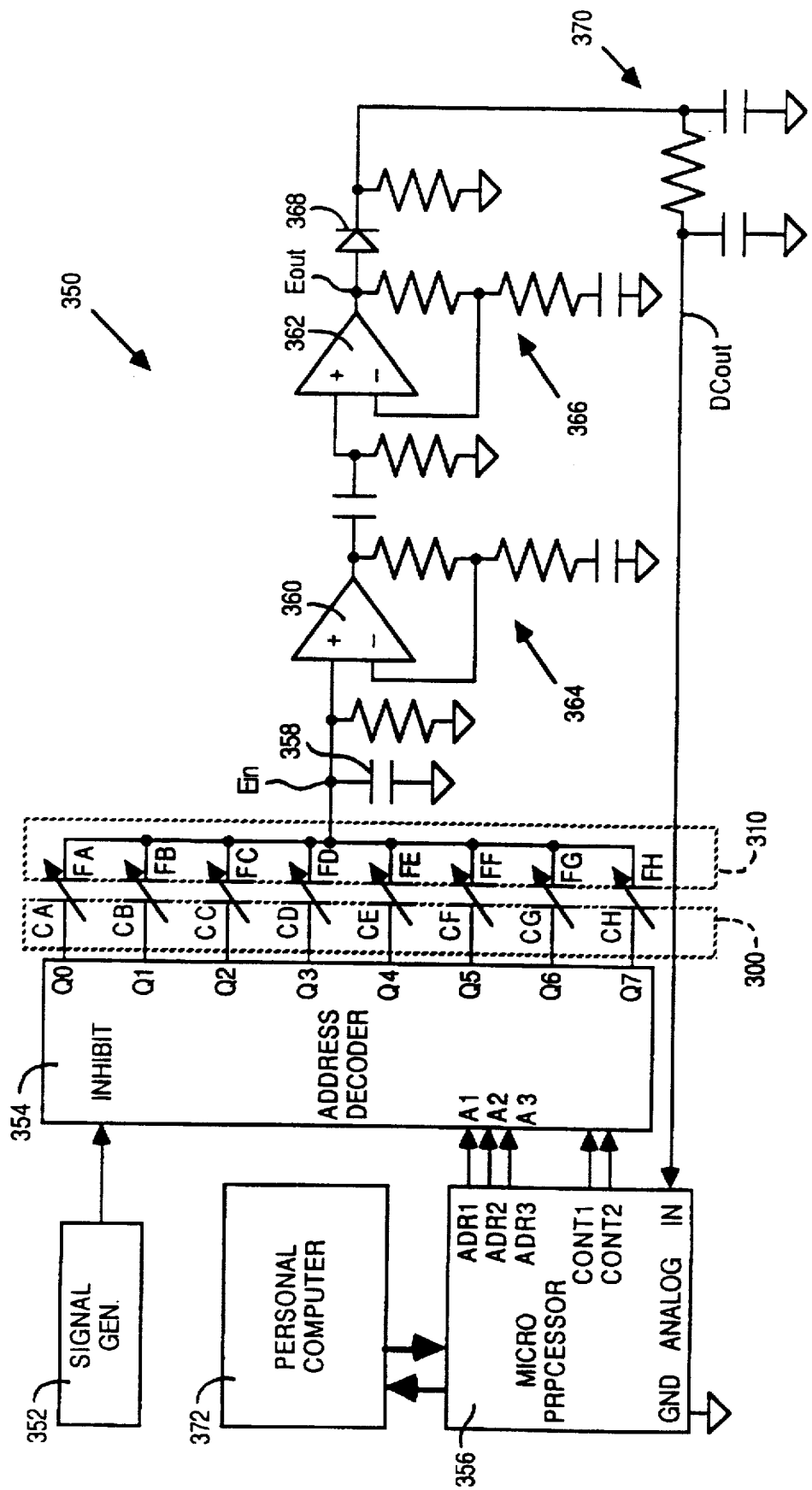
FIG. 16 is a simplified block and electrical circuit diagram showing a preferred capacitively coupled embodiment of an embedded joystick controller of this invention.

FIG. 16 shows an embedded joystick controller 350 suitable for use with joystick 320 of FIG. 15. A signal generator 352 provides an alternating signal, preferably a 8,192 kilohertz, 12 volt square-wave signal, to an inhibit input of an address decoder 354. The alternating signal is preferably tapped off an existing digital clock signal and level converted. A wide range of other frequencies, wave shapes, and amplitudes are also operable in this invention, although the upper audio frequency range is preferred to optimize coupling while minimizing the effects of stray capacitance effects and electromagnetic radiation.

A microprocessor 356 controls three address inputs A1, A2, and A3 of address decoder 354 to sequentially multiplex the square-wave signal to eight outputs Q0 to Q7 of address decoder 354. Outputs Q0 to Q7 are electrically connected to respective capacitor electrodes $C_A$, $C_B$, $C_C$, $C_D$, $C_E$, $C_F$, $C_G$, and $C_H$ of electrode assembly 300, which sequentially receive the square-wave signal for predetermined time periods of about 12 milliseconds each. Of course, a wide range of time periods are operable provided the periods are sufficiently short to provide "real time" measurements of the coupled signals while being sufficiently long to effectively measure the coupled signal.

Associated end faces $F_A$, $F_B$, $F_C$, and $F_D$ and slot faces $F_E$, $F_F$, $F_G$, and $F_H$ of sensor electrode 310 each receive a coupled amount of the square-wave signal that depends on the rotational and translational-axis-induced spacing to its associated capacitor electrode on electrode assembly 300. The spacing is determined by controller 350 based on the following relationships.

A capacitance Cs (in picofarads) for parallel electrode capacitor is represented by Eq. 1.

$$Cs = \frac{0.2244Ae}{D} \quad (1)$$

where A equals the area of the electrode (in square inches), e equals the dielectric constant (about 1.0 for air), and D equals the spacing between capacitor electrodes (in inches). Because all the factors in the numerator of Eq. 1 are constants, Cs may be simplified as represented in Eq. 2.

$$Cs = \frac{K}{D} \quad (2)$$

where K=0.2244 Ae.

A reactance Zs of any capacitor Cs is represented by Eq. 3.

$$Zs = \frac{1}{2\pi F Cs} \quad (3)$$

where F equals frequency.

Substituting K/D of Eq. 2 for Cs in Eq. 3 results in Eq. 4.

$$Zs = \frac{D}{2\pi F K} \quad (4)$$

which represents that the reactance of a parallel plate capacitor is directly proportional to the spacing D between the capacitor electrodes.

For capacitors formed by spacings between capacitor electrodes $C_A$, $C_B$, $C_C$, $C_D$, $C_E$, $C_F$, $C_G$, and $C_H$ of electrode assembly 300 and associated end faces $F_A$, $F_B$, $F_C$, and $F_D$ and slot faces $F_E$, $F_F$, $F_G$, and $F_H$ of sensor electrode 310, let A equal the reactance of the capacitor formed between $C_A$ and $F_A$, let B equal the reactance of the capacitor formed between $C_B$ and $F_B$, . . . , and let H equal the reactance of the capacitor formed between $C_H$ and $F_H$. Then, the spacings representing the six degrees of freedom are represented in Eqs. 5A to 5F.

$$Xt = E - F \quad (5A)$$

$$Yt = G - H \quad (5B)$$

$$Zt = A + B + C + D \quad (5C)$$

$$Xr = (A+D) - (B+C) \quad (5D)$$

$$Yr = (C+D) - (A+B) \quad (5E)$$

$$Zr = (G+H) + (E+F) \quad (5F)$$

where Xt, Yt, Zt represent translations along the X-, Y-, and Z-axes, and Xr, Yr, Zr represent rotations about the X-, Y-, and Z-axes.

Sensor electrode 310 is electrically common to all faces $F_A$ through $F_B$, and is electrically connected to a 1,000 picofarad capacitor 358 the other end of which is grounded. As described above, selected ones of capacitor electrodes $C_A$, $C_B$, $C_C$, $C_D$, $C_E$, $C_F$, $C_G$, and $C_H$ of electrode assembly 300 sequentially receive the square-wave signal while unselected ones of the capacitor electrodes are maintained at a ground potential so that they contribute substantially no charge to capacitor 358. The spacing-determined capacitance values of the selected sensing capacitors ranges from about 0.03 picofarad to about 0.12 picofarad. The 1,000 picofarad value of capacitor 358 is preferably made large relative to the sensing capacitor values to minimize any effects of stray capacitance. Of course, capacitor 358 may have a wide range of values.

An input voltage Ein across capacitor 358 is represented by Eq. 6.

$$Ein = \frac{EgCs}{C358 + Cs} \quad (6)$$

where Eg is the magnitude of the square-wave signal, Cs is the value of the selected sensor capacitor, and C358 is the value of capacitor 358.

But because C358 is much greater than Cs, Eq. 6 can be approximated by Eq. 7.

$$Ein = \frac{EgCs}{C358} \quad (7)$$

Substituting K/D of Eq. 2 for Cs in Eq. 7 results in Eq. 8.

$$Ein = \frac{EgK}{D(C358)} \quad (8)$$

The resulting input voltage Ein typically ranges from about 0.6 millivolts to about 2.4 millivolts, and is inversely proportional to the capacitor spacing D.

Input voltage Ein is applied to a cascaded pair of AC-coupled amplifiers 360 and 362 having feedback networks 364 and 366 that provide a combined gain of about 3,000 at 8,192 Hertz, resulting in an output voltage Eout ranging from about 1.8 volts to about 7.2 volts. Output voltage Eout is peak-detected by a diode 368 and filtered by an RC filter network 370 to remove any significant ripple.

The resulting peak detected DC output DCout is proportional to the value of the selected sensor capacitor Cs. But, because the value of Cs is inversely proportional to the electrode spacing (Eq. 2), DCout is also inversely proportional to the electrode spacing.

Therefore, microprocessor 356 is programmed to perform the following functions:

selecting which sensor capacitor $C_A$ through $C_B$ to measure by addressing address decoder 354;

performing analog-to-digital conversion of DCout for the selected sensor capacitor Cs;

correcting the digitized value of DCout for the forward voltage drop of diode 368;

calculating the sensor capacitor spacing and storing the result;

repeating the above steps for each of the other sensor capacitors;

calculating three translational and three rotational sets of position data is for detector electrode 310 relative to electrode assembly 300; and communicating the sets of position data to a personal computer 372, or another suitable device, by employing an appropriate data communication format, such as RS-232.

Skilled workers will recognize that portions of this invention may be implemented differently from the implementations described above. For example, the actuator handle or hand grip may be in the form of a "T" bar, a trigger grip handle, or a knob-topped handle. The joystick may also include added buttons and/or switches. Moreover, the actuator handle may freely or frictionally rotate in the yaw-axis direction with or without a separate spring return to the equilibrium position.

While X-, Y-, Z-, roll-, pitch-, and yaw-axis designations used in this application are like those used in aircraft, other axis conventions and orientations are possible for this invention.

The physical dimensions, sizes, shapes, and spacings described may be widely varied to adapt to the needs of particular applications.

Likewise, the embedded controller need not be embedded and may employ other than eight bits of analog-to-digital conversion, may be programmed to provide axis rate-of-change output data, and may employ various different components and component values and various combinations of equivalent analog and digital circuits to perform the described functions. Of course, many different combinations of multiplexing, scanning, and sampling frequencies may be employed to achieve substantially the same results.

Sensor electrode 310 may be driven by signal generator 352 and capacitor electrodes $C_A$ through $C_H$ multiplexed and sensed, although stray signals and capacitance may reduce accuracy.

Sensor electrode 310 may also incorporate a shield to decrease sensitivity to external fields and to simplify the circuitry associated with controller 350.

Additional capacitor electrodes may be employed to add redundancy and accuracy to the electrode spacing calculations.

Dome 326 and elastomeric ring 330 may be employed any of the joystick embodiments, as may the compression spring, diaphragm, bladder, or spring suspension techniques.

Controller 350 of FIG. 16 may selectively employ the driving, multiplexing, filtering, lookup table, and other techniques employed by controller 250 of FIG. 10, and vice-versa. For example, the signal produced by signal generator 352 may be derived from a logic signal generated by microprocessor 356.

And, of course, the signal may have any of a wide-range of amplitudes and frequencies suitable to particular applications.

Finally, the RS-232 communications controller may be integral to microprocessor 356 or may be replaced with one of various interconnect technologies, including a parallel interface, a network controller, current loop wiring, twisted pairs of wires, a fiber-optic link, and an infrared link.

It will be obvious to those having skill in the art that many changes may be made to the details of the above-described embodiments of this invention without departing from the underlying principles thereof. Accordingly, it will be appreciated that this invention is also applicable to data input applications other than those found in computers. The scope of the present invention should, therefore, be determined only by the following claims.

We claim:

1. A multiple axis data input apparatus, comprising:

a signal source generating an electrical signal;

an electrode assembly having multiple electrodes that are sequentially coupled to the electrical signal;

a sensor electrode having multiple faces, each face in proximity to an associated electrode of the electrode assembly;

a positioning means for orienting the sensor electrode in at least four predetermined axes relative to the electrode assembly such that each face receives an amount of the electrical signal that depends on an orientation-induced spacing between each face and its associated electrode and in which each face provides a signal amplitude in response to the amount of the electrical signal received; and a controller that receives and processes the signal amplitudes and generates spacing data related to the orientation-induced spacing between each face and its associated electrode.

2. The apparatus of claim 1 in which the predetermined number of axes is at least four, and the at least four axes are selected from a group consisting of an X-translation axis, a Y-translation axis, a Z-translation axis, a roll-axis, a pitch-axis, and a yaw-axis.

3. The apparatus of claim 1 in which the predetermined number of axes is six, and the six axes include an X-translation axis, a Y-translation axis, a Z-translation axis, a roll-axis, a pitch-axis, and a yaw-axis.

4. The apparatus of claim 1 in which the electrode assembly has mutually orthogonal electrodes, which together with the associated faces of the sensor electrode comprise mutually orthogonal capacitor electrode pairs positioned such that each capacitor electrode is separated from its associated sensor electrode face by the orientation-induced spacing.

5. The apparatus of claim 4 in which each of the electrodes has a major axial dimension that is substantially less than a corresponding major axial dimension of its associated sensor electrode face.

6. The apparatus of claim 1 in which the controller generates spatial orientation data for a Z-translation axis by employing a common-mode signal derived from the signal amplitudes employed to generate the spacing data for at least one of a roll-axis and a pitch-axis.

7. The apparatus of claim 1 in which the sensor electrode is formed from at least one of an electrically conductive material and a nonconductive material covered with an electrically conductive material.

8. The apparatus of claim 1 in which the sensor electrode is enclosed within an electrically conductive shield that decreases the sensitivity of the multiple faces to external electrical fields.

9. A multiple axis data input apparatus, comprising:

a signal source generating an electrical signal;

an electrode assembly having multiple electrodes coupled to the electrical signal;

a sensor electrode having multiple faces, each face in proximity to an associated electrode of the electrode assembly;

a positioning means for orienting the sensor electrode in at least four predetermined axes relative to the electrode assembly such that each face receives an amount of the electrical signal that depends on an orientation-induced spacing between each face and its associated electrode and in which each face provides a signal amplitude in response to the amount of the electrical signal received;

a controller that processes the signal amplitudes with an amplifier, a peak detector, a filter, and an analog-to-digital converter to produce conditioned signal amplitudes; and a microprocessor that processes the conditioned signal amplitudes to generate spacing data related to the orientation-induced spacing between each face and its associated electrode.

10. The apparatus of claim 9 in which the predetermined number of axes is at least four, and the at least four axes are selected from a group consisting of an X-translation axis, a Y-translation axis, a Z-translation axis, a roll-axis, a pitch-axis, and a yaw-axis.

11. The apparatus of claim 9 in which the predetermined number of axes is six, and the six axes include an X-translation axis, a Y-translation axis, a Z-translation axis, a roll-axis, a pitch-axis, and a yaw-axis.

12. The apparatus of claim 9 in which the signal source generates an alternating electrical signal that is sequentially electrically connected to the multiple electrodes.

13. The apparatus of claim 9 in which the electrode assembly has mutually orthogonal electrodes, which together with the associated faces of the sensor electrode comprise mutually orthogonal capacitor electrode pairs positioned such that each capacitor electrode is separated from its associated sensor electrode face by the orientation-induced spacing.

14. The apparatus of claim 13 in which each of the electrodes has a major axial dimension that is substantially less than a corresponding major axial dimension of its associated sensor electrode face.

15. The apparatus of claim 9 in which the microprocessor further processes the spacing data to compute spatial orientation data related to the orientation in each of the predetermined number of axes of the electrode assembly relative to the sensor electrode.

16. The apparatus of claim 9 in which the controller generates spatial orientation data for a Z-translation axis by employing a common-mode signal derived from the signal amplitudes employed to generate the spacing data for at least one of a roll-axis and a pitch-axis.

17. The apparatus of claim 9 in which the sensor electrode is formed from at least one of an electrically conductive material and a nonconductive material covered with an electrically conductive material.

18. The apparatus of claim 9 in which the sensor electrode is enclosed within an electrically conductive shield that decreases the sensitivity of the multiple faces to external electrical fields.

19. A multiple axis data input apparatus, comprising:

a signal source generating an electrical signal;

an electrode assembly having multiple electrodes coupled to the electrical signal;

a sensor electrode having multiple faces, each face in proximity to an associated electrode of the electrode assembly;

a positioning means for orienting the sensor electrode in at least four predetermined axes relative to the electrode assembly such that each face receives an amount of the electrical signal that depends on an orientation-induced spacing between each face and its associated electrode and in which each face provides a signal amplitude in response to the amount of the electrical signal received, the positioning means including at least one of a compression spring, a flexible diaphragm, a bladder, a network of springs, and an elastomeric ring that acts to position the sensor electrode in an equilibrium position relative to the electrode assembly; and a controller that receives and processes the signal amplitudes and generates spacing data related to the orientation-induced spacing between each face and its associated electrode.

20. The apparatus of claim 19 in which the predetermined number of axes is at least four, and the at least four axes are selected from a group consisting of an X-translation axis, a Y-translation axis, a Z-translation axis, a roll-axis, a pitch-axis, and a yaw-axis.

21. The apparatus of claim 19 in which the predetermined number of axes is six, and the six axes include an X-translation axis, a Y-translation axis, a Z-translation axis, a roll-axis, a pitch-axis, and a yaw-axis.

22. The apparatus of claim 19 in which the signal source generates an alternating electrical signal that is sequentially electrically connected to the multiple electrodes.

23. The apparatus of claim 19 in which the electrode assembly has mutually orthogonal electrodes, which together with the associated faces of the sensor electrode comprise mutually orthogonal capacitor electrode pairs positioned such that each capacitor electrode is separated from its associated sensor electrode face by the orientation-induced spacing.

24. The apparatus of claim 23 in which each of the electrodes has a major axial dimension that is substantially less than a corresponding major axial dimension of its associated sensor electrode face.

25. The apparatus of claim 19 in which the controller conditions the signal amplitudes with an amplifier, a peak detector, a filter, and an analog-to-digital converter, and a microprocessor processes the conditioned signal amplitudes to generate the spacing data.

26. The apparatus of claim 25 in which the microprocessor further processes the spacing data to compute spatial orientation data related to the orientation in each of the predetermined number of axes of the electrode assembly relative to the sensor electrode.

27. The apparatus of claim 19 in which the controller processes the signal amplitudes with a peak detector, a filter, and an analog-to-digital converter to generate the spacing data related to each of the signal amplitudes and further employs the spacing data to access a lookup table that returns information for generating spatial orientation data.

28. The apparatus of claim 19 in which the controller generates spatial orientation data for a Z-translation axis by employing a common-mode signal derived from the signal amplitudes employed to generate the spacing data for at least one of a roll-axis and a pitch-axis.

29. The apparatus of claim 19 in which the sensor electrode is formed from at least one of an electrically conductive material and a nonconductive material covered with an electrically conductive material.

30. The apparatus of claim 19 in which the sensor electrode is enclosed within an electrically conductive shield that decreases the sensitivity of the multiple faces to external electrical fields.

31. The apparatus of claim 19 in which the elastomeric ring imparts a biasing force to the sensor electrode that suspends the sensor electrode in an equilibrium position relative to the electrode assembly.

32. The apparatus of claim 31 in which the sensor electrode is coupled to the elastomeric ring by a rigid dome that facilitates positioning the sensor electrode in at least six predetermined axes relative to the electrode assembly.

33. The apparatus of claim 31 in which the biasing force is proportional to deformation of the elastomeric ring in at least one of a compression stress, a tension stress, and a shear stress.

34. The apparatus of claim 31 in which the elastomeric ring provides a substantially frictionless and a substantially damped positioning of the sensor electrode relative to the electrode assembly.

35. A multiple axis data input apparatus, comprising:

a signal source generating an electrical signal;

an electrode assembly having multiple electrodes coupled to the electrical signal;

a sensor electrode having multiple faces, each face in proximity to an associated electrode of the electrode assembly;

a positioning means for orienting the sensor electrode in at least four predetermined axes relative to the electrode assembly such that each face receives an amount of the electrical signal that depends on an orientation-induced spacing between each face and its associated electrode and in which each face provides a signal amplitude in response to the amount of the electrical signal received, the positioning means including an elastomeric ring that suspends the sensor electrode relative to the electrode assembly and isolates the sensor electrode and the electrode assembly from at least one of dust, dirt, contaminants, and electric fields; and a controller that receives and processes the signal amplitudes and generates spacing data related to the orientation-induced spacing between each face and its associated electrode.

36. The apparatus of claim 35 in which the predetermined number of axes is at least four, and the at least four axes are selected from a group consisting of an X-translation axis, a Y-translation axis, a Z-translation axis, a roll-axis, a pitch-axis, and a yaw-axis.

37. The apparatus of claim 35 in which the predetermined number of axes is six, and the six axes include an X-translation axis, a Y-translation axis, a Z-translation axis, a roll-axis, a pitch-axis, and a yaw-axis.

38. The apparatus of claim 35 in which the signal source generates an alternating electrical signal that is sequentially electrically connected to the multiple electrodes.

39. The apparatus of claim 35 in which the electrode assembly has mutually orthogonal electrodes, which together with the associated faces of the sensor electrode comprise mutually orthogonal capacitor electrode pairs positioned such that each capacitor electrode is separated from its associated sensor electrode face by the orientation-induced spacing.

40. The apparatus of claim 39 in which each of the electrodes has a major axial dimension that is substantially less than a corresponding major axial dimension of its associated sensor electrode face.

41. The apparatus of claim 35 in which the controller conditions the signal amplitudes with an amplifier, a peak detector, a filter, and an analog-to-digital converter, and a microprocessor processes the conditioned signal amplitudes to generate the spacing data.

42. The apparatus of claim 41 in which the microprocessor further processes the spacing data to compute spatial orientation data related to the orientation in each of the predetermined number of axes of the electrode assembly relative to the sensor electrode.

43. The apparatus of claim 35 in which the controller processes the signal amplitudes with a peak detector, a filter, and an analog-to-digital converter to generate the spacing data related to each of the signal amplitudes and further employs the spacing data to access a lookup table that returns information for generating spatial orientation data.

44. The apparatus of claim 35 in which the controller generates spatial orientation data for a Z-translation axis by employing a common-mode signal derived from the signal amplitudes employed to generate the spacing data for at least one of a roll-axis and a pitch-axis.

45. The apparatus of claim 35 in which the sensor electrode is formed from at least one of an electrically conductive material and a nonconductive material covered with an electrically conductive material.

46. The apparatus of claim 35 in which the sensor electrode is enclosed within an electrically conductive shield that decreases the sensitivity of the multiple faces to external electrical fields.

47. The apparatus of claim 35 in which the elastomeric ring acts to position the sensor electrode in an equilibrium position relative to the electrode assembly.

48. The apparatus of claim 35 in which the elastomeric ring imparts a biasing force to the sensor electrode that suspends the sensor electrode in an equilibrium position relative to the electrode assembly.

49. The apparatus of claim 48 in which the biasing force is proportional to deformation of the elastomeric ring in at least one of a compression stress, a tension stress, and a shear stress.

50. The apparatus of claim 35 in which the sensor electrode is coupled to the elastomeric ring by a rigid dome that facilitates positioning the sensor electrode in at least six predetermined axes relative to the electrode assembly.

51. The apparatus of claim 35 in which the elastomeric ring provides a substantially frictionless and a substantially damped positioning of the sensor electrode relative to the electrode assembly.

52. In a multiple axis data input apparatus, a method of generating spatial orientation data, comprising:

providing a source of an electrical signal;

coupling an electrode assembly having multiple electrodes to the electrical signal;

mounting a sensor electrode having at least three mutually orthogonal faces such that each face is in proximity to an associated electrode of the electrode assembly, the multiple electrodes and faces forming multiple capacitor electrodes positioned such that each capacitor electrode is separated from an associated face of the sensor electrode by the orientation-induced spacing;

orienting the sensor electrode in at least four predetermined axes relative to the electrode assembly such that each face receives an amount of the electrical signal that depends on an orientation-induced spacing between each face and its associated electrode and in which each face provides a signal amplitude in response to the amount of the electrical signal received;

sampling the signal amplitudes sequentially;

detecting a peak amplitude of each of the sequentially sampled signal amplitudes;

converting the peak amplitude of each of the sequentially sampled signal amplitudes into spacing data; and computing from the spacing data the spacial orientation data.

53. The method of claim 52 in which the predetermined number of axes are selected from a group consisting of an X-translation axis, a Y-translation axis, a Z-translation axis, a roll-axis, a pitch-axis, and a yaw-axis.

54. The method of claim 52 further including coupling capacitively the sensor electrode to the electrodes.

55. The method of claim 52 further including suspending the sensor electrode in an equilibrium position and providing a restoring force that acts to position the sensor electrode in the equilibrium position.

56. In a multiple axis data input apparatus, a method of generating spatial orientation data, comprising:

providing a source of an electrical signal;

coupling an electrode assembly having multiple electrodes to the electrical signal;

mounting a sensor electrode having multiple faces such that each face is in proximity to an associated electrode of the electrode assembly;

suspending the sensor electrode in an equilibrium position and providing a restoring force that acts to position the sensor electrode in the equilibrium position, the suspending carried out by at least one of a compression spring, a flexible diaphragm, a bladder, a network of springs, and an elastomeric ring;

orienting the sensor electrode in at least four predetermined axes relative to the electrode assembly such that each face receives an amount of the electrical signal that depends on an orientation-induced spacing between each face and its associated electrode and in which each face provides a signal amplitude in response to the amount of the electrical signal received;

processing the signal amplitudes to generate spacing data related to the orientation-induced spacing between each face and its associated electrode; and computing from the spacing data the spacial orientation data.

57. The method of claim 56 in which the predetermined number of axes are selected from a group consisting of an X-translation axis, a Y-translation axis, a Z-translation axis, a roll-axis, a pitch-axis, and a yaw-axis.

58. The method of claim 56 further including coupling capacitively the sensor electrode to the electrodes.

59. The method of claim 56 in which the sensor electrode has at least three mutually orthogonal faces, and the multiple electrodes comprise multiple mutually orthogonal capacitor electrodes positioned such that each capacitor electrode is separated from an associated face of the sensor electrode by the orientation-induced spacing, the processing step further including:

sampling the signal amplitudes sequentially;

detecting a peak amplitude of each of the sequentially sampled signal amplitudes; and converting the peak amplitude of each of the sequentially sampled signal amplitudes into the spacing data.

60. The method of claim 56 in which the elastomeric ring imparts the biasing force to the sensor electrode, the biasing force acting to suspend the sensor electrode in an equilibrium position relative to the electrode assembly.

61. The method of claim 60 in which the sensor electrode is mechanically coupled to the elastomeric ring by a rigid dome that facilitates orienting the sensor electrode in at least six predetermined axes relative to the electrode assembly.

* * * * *